June 15, 1937.    L. H. VON OHLSEN    2,083,932
TEMPERATURE CONTROLLING SYSTEM
Filed Sept. 29, 1932    2 Sheets-Sheet 1
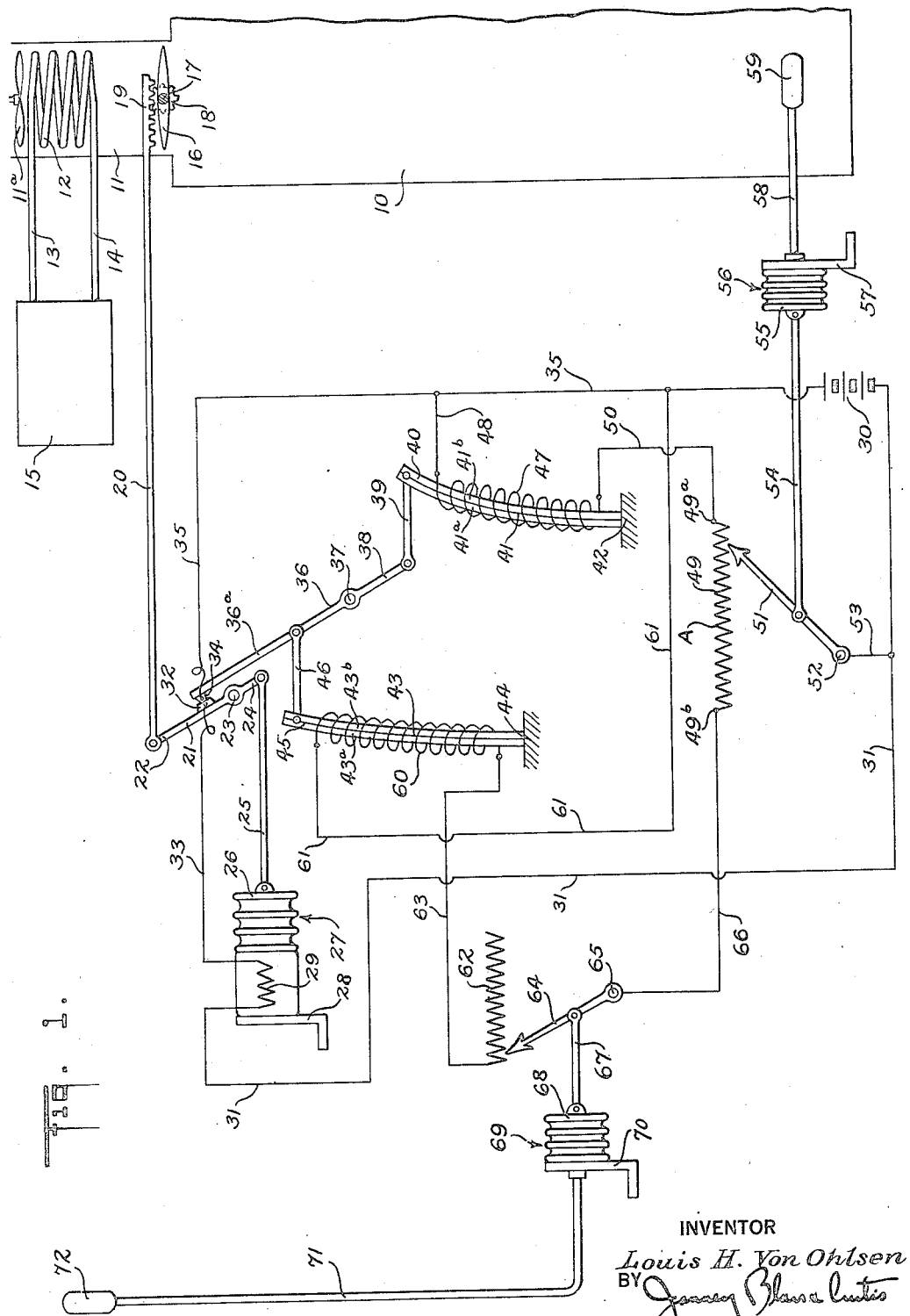
INVENTOR
*Louis H. Von Ohlsen*
BY
ATTORNEYS

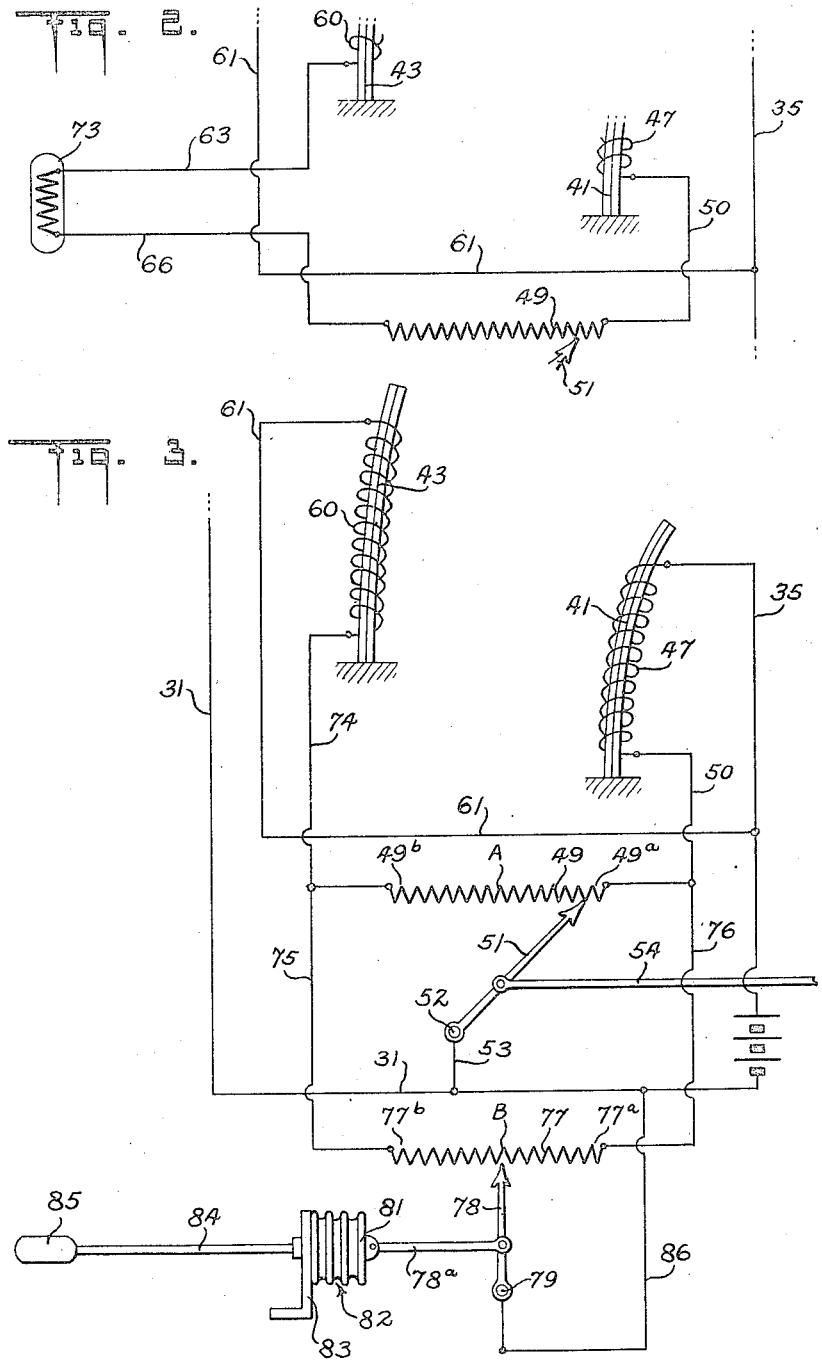

Patented June 15, 1937

2,083,932

UNITED STATES PATENT OFFICE 2,083,932

TEMPERATURE CONTROLLING SYSTEM

Louis H. Von Ohlsen, New Haven, Conn., assignor to The Safety Car Heating & Lighting Company, a corporation of New Jersey Application September 29, 1932, Serial No. 635,328

27 Claims. (Cl. 236—97)

This invention relates to a method and apparatus for regulating the temperature of a space such as a room, theatre, railway car, or the like.

One of the objects of this invention is to provide a temperature regulating system whose construction will be simple and practical and whose operation will be reliable. Another object is to provide a system of the above-mentioned character, the operation of which will be efficient and accurate regardless of the peculiar and varied conditions of climate, seasonal changes, weather changes, and the like, under which it is forced to operate. Another object is to provide a system of the above-mentioned character whose construction and installation will be economical and whose operating cost will be reduced to a minimum. Another object is to provide a system of the above-mentioned character which will operate successfully for long periods of time with little or no necessity for outside attention of any character. Another object is to provide a system of the above-mentioned character which will maintain a comfortable, heathful and pleasing temperature in a room or the like regardless of outside weather or climatic conditions. Another object is to provide a system of the above-mentioned character whose operation is reliably sympathetic and promptly responsive to the variations of climate and temperature outside of the space whose temperature is being regulated. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein and the scope of the application of which will be indicated in the following claims.

In the accompanying drawings, in which are shown several of the various possible embodiments of my invention, Figure 1 is a diagrammatic view showing a preferred embodiment of my invention as installed for use;

Figure 2 is a diagrammatic representation of another embodiment of certain features of my invention, certain parts of the system being similar to those shown in Figure 1 and hence omitted from Figure 2, and Figure 3 is a diagrammatic representation of another embodiment of certain features of my invention, certain parts of the system being similar to those shown in Figure 1 and hence omitted from Figure 3.

Similar reference characters refer to similar parts throughout the several views of the drawings.

As conducive to a clearer understanding of certain features of this invention, it might here be pointed out that one of the most glaring deficiencies of many of the common forms of temperature regulating systems is their inability to respond to and cope with the various changes in outside temperature. This is particularly true of cooling systems which are intended to maintain a constant temperature level in a room, or the like, regardless of an uncomfortably high temperature outside. The operation of such systems proceeds upon the assumption that the human body reacts most favorably to a temperature in the vicinity of 70° F. regardless of outside temperature. I have discovered that this theory is fallacious and that, when the outside temperature is quite high, for example, and the human body has been subjected to such a temperature for a considerable period of time, it gradually adjusts itself to such a temperature condition, and, that, if it is then suddenly subjected to a material decrease of temperature, its reaction thereto is harmful and necessitates another lengthy and uncomfortable period of readjustment. For example, if a person spending the greater portion of a day in a temperature of 90° enters a room where the temperature is maintained at 70°, he experiences considerable discomfort, at least until the above-mentioned readjustment is complete. If, on the other hand, that same person enters a room at a temperature of, for example, 80°, the contrast between the inside temperature and the outside temperature is not so great as to require a marked period of readjustment, and, yet, a person under such circumstances, I have discovered, receives ample cooling effect. One of the various objects of this invention is to provide a system in which the above-mentioned difficulties as well as many others are successfully overcome.

Turning now to Figure 1, there is shown a space 10 which may be a railway car, theatre, room, or the like, and which is to be maintained at a comfortable temperature constantly. Preferably I provide a conduit 11 leading into space 10, and within the conduit 11 is disposed in any suitable manner a cooling or heat-abstracting coil 12 or any other suitable apparatus for cooling. Accordingly, when air is forced through conduit 11, as by a fan 11a, it is cooled by coil 12 before entering space 10. Suitably associated with coil 12, preferably by way of conduits 13 and 14, is the remaining portion 15 of cooling apparatus; the latter may assume any appropriate form of refrigerating apparatus.

In order to regulate the amount of cool air entering space 10 by conduit 11, I prefer to provide a damper 16 adapted to pivot about the axis of shaft 17 to which it is secured. Preferably fixed to shaft 17, in any convenient manner, is a pinion 18 meshing with a rack 19 secured to or integral with a rod 20. Thus, when rod 20 is moved in a right-hand direction as viewed in the drawings, damper 16 opens and, conversely, when rod 20 is moved in a left-hand direction, damper 16 finally assumes the closed position shown in the drawings.

Rod 20 is pivotally connected to an end 22 of a lever 21 which is in turn preferably pivoted at 23. The other end 24 of lever 21 is preferably connected to a rod 25 which is in turn connected, in any suitable manner, to the free or unanchored end 26 of a thermostatic bellows generally indicated at 27. Thermostatic bellows 27 contains a thermally responsive fluid so that it expands upon being heated to move rod 25 in a right-hand direction, as viewed in Figure 1, and contracts when cooled to move the rod 25 toward the left.

Bellows 27 is anchored or supported in any suitable manner as at 28 and suitably associated therewith is an electric heating coil 29. When coil 29 is energized, it supplies heat to raise the vapor tension of the fluid within the bellows and hence to expand bellows 27 and move rod 25 in a direction toward the right and, upon deenergization thereof, the bellows contracts to move rod 25 in the opposite direction. One side of heater 29 is connected by way of a conductor 31 to any suitable source of current, as, for example, a storage battery 30. The other side of coil 29 is connected by conductor 33 to a contact 32 suitably associated with end 22 of lever 21, and a contact 34 coacting with contact 32 to form a switch is connected to the other side of battery 30 by a conductor 35.

If, now, the cooling apparatus 15 is operating and a draft of air is being forced past cooling coils 12, the position of damper 16 controls the amount of cooled air entering space 10, and consequently the temperature of the space; the relative position of contacts 32 and 34 with respect to each other controls the position of damper 16. More specifically, when contacts 32 and 34 are in engagement, a circuit is completed between heater coil 29 and battery 30; that circuit extends from one side of the battery 30, conductor 31, heater coil 29, conductor 33, contact 32, contact 34, and by way of conductor 35 back to the battery 30. Heater 29 heats bellows 27 and consequently causes it to expand.

The expansion of bellows 27 moves rod 25 toward the right as viewed in the drawings, and consequently impels lever 21 to move rod 20 toward the left, thus closing or partially closing damper 16. Conversely, the disengagement of contacts 32 and 34 breaks the above-described circuit to deenergize heater coil 29 and, upon the consequent contraction of bellows 27, rod 25 and lever 21 operate to force rod 20 to the right to swing damper 16 in conduit-opening direction. Primarily, then, the temperature of space 10 may be regulated by the engagement and disengagement of contacts 32 and 34 for, upon engagement thereof, cool air is partially or completely excluded from space 10 and, upon disengagement thereof, cool air is admitted to the space. It should be distinctly understood that other methods or apparatus might be employed for controlling the effectiveness of cooling apparatus 15 and that rod 20 might be, for such purpose, suitably associated with such other controlling apparatus therefor. The damper means, therefore, is, in so far as certain features of my invention are concerned, to be considered as illustrative. However, I have found the use of damper 16 well adapted for this purpose and well able to cope with the various peculiar conditions met with in practice.

Contact 34 is preferably carried by one end 36a of a lever 36 which is pivoted at 37. The other end 38 of lever 36 is pivotally connected to link 39 which is in turn connected to the free end 40 of a bi-metallic member 41. The other end of member 41 is suitably anchored as at 42. Bi-metallic member 41 may be made of two strips of dissimilarly temperature-responsive metals, such as the strip 41a of brass and the strip 41b of invar, so that an increase in the temperature of member 41 causes a bending or warping thereof to move end 40 in a right-hand direction as viewed in Figure 1 and, a decrease in temperature, causes a reverse bending. Accordingly, when the temperature of bi-metallic member 41 is increased, link 39 is moved in a right-hand direction to move contact 34, mounted upon lever 36, in a left-hand direction or toward contact 32.

A bi-metallic member 43, substantially similar in character to bi-metallic member 41, is anchored at 44 and its free end 45 is connected to end 36a of lever 36 by way of a link 46. Bi-metallic member 43 may also be formed of a brass strip 43a and a strip 43b of invar so that an increase of its temperature forces end 45 thereof in a right-hand direction and a decrease in its temperature tends to straighten member 43 or move end 45 in a left-hand direction. Consequently, a decrease in the temperature of bi-metallic member 43 causes contact 34 to move toward contact 32 while an increase in the temperature thereof moves contact 34 away from contact 32.

Suitably associated with bi-metallic member 41 is an electric heating coil 47, one side of which is connected to conductor 35, and hence to one side of the battery 30, by way of a conductor 48. The other side of heater 47 is connected to the end of portion 49a of resistance 49 by a conductor 50. A movable contact arm 51 engages the resistance 49 so as to vary the resistance of the circuit or circuits in which resistance 49 and arm 51 are included. Arm 51 is pivoted at 52 and is connected by conductor 53 to conductor 31 which leads to battery 30. In this manner, a circuit is established between battery 30 and heater 47; this circuit extends from the battery 30, conductors 35 and 48, to one side of the heater 47, thence by way of conductor 50, resistance 49, arm 51, conductor 53, and conductor 31 back to the other side of the battery 30.

Pivotally connected to arm 51 is a rod 54 which is secured to the free end 55 of a temperature responsive member preferably in the form of a bellows generally indicated at 56. Bellows 56 is anchored or supported at one end in any suitable manner, as by a bracket 57 and its interior is connected by a conduit 58 to a bulb 59 positioned within space 10; bulb 59 preferably contains a volatile liquid. The liquid contained in bulb 59 is of such a character that an increase in the temperature of space 10 increases the vapor tension thereof to expand bellows 56 and consequently to move rod 54 to the left, to swing arm 51 to the left to increase that part of resistance 49 in the circuit of heater coil 47 and battery 30, while a decrease of its temperature causes condensation and reduction of vapor pressure and subsequent contraction of the bellows 56 to decrease the resistance in this circuit.

Thermally associated with bi-metallic member 43 is an electric heater coil 60 having one terminal connected to conductor 35 by a conductor 61. The other side of coil 60 is connected to a resistance 62 by a conductor 63. A contact arm 64, preferably similar in character to contact arm 51, is pivoted at 65 and it engages resistance 62; a conductor 66 connects arm 64 to the end of portion 49b of resistance 49. A circuit is accordingly completed between coil 60 and battery 30, this circuit extending from one side of the battery 30, conductors 35 and 61, to one side of the heater 60, and thence by way of conductor 63, resistance 62, arm 64, conductor 66, resistance 49, arm 51 and conductors 53 and 31, back to the other side of battery 30.

Accordingly, heaters 60 and 47 are connected in parallel with battery 30 and the amount of heating current flowing through each coil may be regulated by resistances 49 and 62. Assuming for the moment that resistance 62 is cut out of the circuit of the heater coils and the battery or, in other words, that arm 64 is in the position shown in Figure 1, the position of arm 51 along resistance 49 determines by itself the relative amounts of current flowing through heater coils 47 and 60. Thus, there is a critical point A on resistance 49 and, if arm 51 is positioned to the right of point A to decrease portion 49a thereof, more current flows through heater 47 to heat bi-metallic member 41 than flows through heater 60, for now a greater portion of resistance 49 is included in the circuit of heater coil 60. As described above, the parts are, due to this difference in the heating of members 43 and 41, placed in the position shown in Figure 1 so that contact 34 engages contact 32 to energize heater coil 29 and close damper 16.

However, should arm 51 pass critical point A and be positioned somewhere to the left thereof, as viewed in the drawings, more current flows through heater coil 60 than through heater coil 47, thus to produce an opposite effect or, in other words, a bending of bi-metallic member 43 and a straightening of bi-metallic member 41 to force contact 34 away from contact 32 and to discontinue heating action by heater 29 and to open damper 16.

Arm 64 is moved along resistance 62 by an arm 67 connected to the free end 68 of a bellows generally indicated at 69. Bellows 69 may be anchored or supported in any suitable manner as, by a bracket 70, and is connected by way of a conduit 71 to a bulb 72 positioned outside of space 10 and preferably outside of any building or structure within which space 10 is located. Bulb 72 contains a volatile liquid similar in character to the volatile liquid described above in connection with bulb 59, so that an increase in the temperature thereof causes an expansion of bellows 69 to move arm 64 in a right-hand direction, as viewed in the drawings, thus to increase the amount of resistance 62 in the circuit of heater coil 60, while a decrease in the temperature to which bulb 72 is subjected causes a contraction of bellows 69 and a decrease in resistance 62.

Such a movement of arm 64 to increase the resistance 62 in the circuit of heater coil 60 and battery 30 also adds this resistance to portion 49b of resistance 49. In effect, a different standard of operation is thus set and virtually this changes the position of critical point A on resistance 49 so that even though arm 51 passes critical point A and moves into the left-hand portion thereof, as viewed in the drawings, it may happen that the added portion of resistance 62 is sufficient to overcome the decrease of resistance in the circuit of coil 60 due to the movement of arm 51 so that the current flowing through heater coil 60 still remains less than the current flowing through heater coil 47. In such case, due to the co-ordinated action of bi-metallic members 41 and 43 on lever 36, contact 34 remains in substantially the same position relative to contact 32, all as will be more clearly described hereinafter.

Turning now to the operation of the embodiment of my invention shown in Figure 1, let it be assumed that this system is mounted upon a railway car or the like and that it is desired to maintain predetermined temperature differences between the interior of the car or space 10 and the temperature outside thereof. Further, let it be assumed that a difference is to be maintained between the temperature within the car and that outside when the temperature outside the space rises above a certain value, for example, 80°. Under such circumstances, the car is to be maintained at a 70° temperature as long as the temperature outside the space is at or below 80° but, should the outside temperature rise above 80°, the inside temperature is to be proportionately increased above the 70° minimum.

Under these assumed conditions, bulb 59 within the car 10 responds to the temperature of the space, expands bellows 56 and moves arm 51 past the critical point A to decrease portion 49b of resistance 49, when the temperature of the car rises above 70°. In a like manner, bulb 72 responds to the temperature outside the space 10, expands bellows 69, and moves arm 64 along resistance 62 from the zero point thereof a distance proportionate to the number of degrees above 80 which the outside temperature happens to be.

Now let it be assumed that there are passengers in the car and that the latter is in transit and that the temperature outside of the car becomes less than 80° so that, for purposes of comfort, it is not desirable to maintain any difference between the temperature inside the space and that outside the space, but rather preferably to maintain a constant temperature of 70°. Under these conditions, bellows 69 is contracted so that arm 64 is moved toward the zero position on resistance 62.

Suppose, now, that the temperature of the car rises to 72° so that a reduction thereof is desired. Bellows 56 expands to move arm 51 by way of rod 54 in a left-hand direction, as viewed in the drawings, and past critical point A to decrease portion 49b of the resistance 49. Now the resistance (portion 49a) in the circuit of heater 47 and battery 30 is increased and the resistance (portion 49b) in the circuit of heater 60 and battery 30 is decreased proportionately so that heater 47 and bi-metallic member 41 are at a less temperature than heater 60 and bi-metallic member 43. As described above, the free end 40 of bi-metallic member 41 moves to the left in such a case and free end 45 of bi-metallic member 43 moves to the right to move contact 34 away from contact 32 and break the circuit between heater 29 and battery 30. The cooling of bellows 27 moves rod 20 in a right-hand direction to open damper 16 and admit cool air from conduit 11 to the car.

Should bellows 27 contract too far and hence move rod 20 too far to the right, as viewed in the drawings, and open damper 16 too much, contact 32, which during such action is moving toward contact 34, engages this contact with the result that the circuit between heater 29 and battery 30 is again completed. The heating action of heater 29, however, causes an opposite effect, thus to move contact 32 away from contact 34 and break the circuit. Accordingly, this action is modulated and continues until damper 16 has come to the exact position required to admit sufficient cool air to the car 10 to bring the temperature to 70°. This action is particularly advantageous where the space 10 is the interior of a railway car, as here assumed, where the possibility of heat leakage is great. In such a case, it may be desirable to leave damper 16 open somewhat to admit cool air more or less continuously to the interior of the car in order to maintain the desired temperature in spite of such heat leakage from the exterior to the interior. The exact position of the damper 16 for such a result is determined in a reliable manner by the above-described action and control of contacts 32 and 34.

Should the temperature of the interior 10 fall below 70° by any chance, condensation of the liquid in bulb 59 takes place to contract bellows 56 and move arm 51 in a right-hand direction past critical point A to a position substantially similar to that shown in the drawings, portion 49a of resistance 49 now being decreased. Now there is less resistance in the circuit of heater coil 47 and battery 30 than in the circuit of heater coil 60 and battery 30. Consequently, bi-metallic member 41 is more highly heated while bi-metallic member 43 is less highly heated, thus to move contact 34 into engagement with contact 32. Again, the circuit between heater coil 29 and battery 30 is completed to expand bellows 27 and move damper 16 toward closing position, as described above, thus cutting down or shutting off the supply of cool air to interior 10. Should this expanding action of the bellows 27 move contact 32 out of engagement with contact 34 to break the circuit of heater 29, the bending of bi-metallic member 41 under the increased heating action of heating coil 47 and the bending, under the cooling, of bi-metallic member 43 move contact 34 into engagement with contact 32 again to keep the damper 16 closed until the temperature of the interior 10 rises to or above 70° when bellows 56 expands to repeat the above-described action.

Accordingly, under these assumed conditions, when the temperature outside of the car is below a certain value, as 80°, the system operates in a reliable and efficient manner to maintain a 70° temperature within the interior of the car in a practical and accurate manner.

Railway cars making trips of considerable distance often pass through widely varying temperature conditions, due to weather, time of day, or climate. Thus, the outside temperature, besides varying due to changes in location of the car, is also subject to the various changes incident to the time of day, as, for example, the usual drop at night and a rise during the following morning. Let it now be assumed that the car upon which my system has been installed passes into a district where the temperature is a number of degrees higher than the outside temperature which was first above assumed. For example, suppose the outside temperature now changes to 85°. If the interior 10 should remain at a temperature of 70°, persons entering and leaving the car or space would be made uncomfortable by the great contrast between the inside and outside temperatures. Not only does this cause disagreeableness but also it is unhealthy and may cause colds and like disorders. However, if the outside temperature rises to 85°, temperature-responsive bulb 72 causes bellows 69 to expand and move arm 64 in a right-hand direction as viewed in the drawings. Accordingly, additional resistance is placed in the branch circuit of heater coil 60 and battery 30 and the amount of this resistance is proportionate to the assumed 5° rise over 80°; thus a new standard of control of contacts 34—32 and hence of the damper 16 is established, now to maintain a temperature of say 72° in space 10.

Now, when the temperature of the interior of the car rises above 70° to move arm 51 past critical point A on resistance 49 and decreasing portion 49b, as described above, this has little or no effect upon the relative position of bi-metallic members 43 and 41, for even though portion 49b of resistance 49 in the circuit of heater coil 60 and battery 30 is less so that this heater should maintain the bi-metallic member 43 at a temperature greater than that of bi-metallic member 41, the additional resistance added by the movement of arm 64 in a right-hand direction operates to cut down the current through the heater coil and maintain the new standard. Accordingly, contact 34 remains in engagement with contact 32, as shown in the drawings, and damper 16 remains closed. This condition continues for any temperature up to 72°, although the interior 10 of the car will quickly assume such a temperature.

However, when the temperature of the car rises above 72°, arm 51 is moved to the left on resistance 49 so that the sum of portion 49b of resistance 49 and resistance 62 in the circuit of heater coil 60 and battery 30 is less than portion 49a in the circuit of heater coil 47 and battery 30. Consequently, bi-metallic member 41 becomes cooler than bi-metallic member 43 so that the free end 40 of bi-metallic member 41 moves in a left-hand direction while the free end 45 of bi-metallic member 43 moves in a right-hand direction to break contacts 32 and 34, thus to de-energize heater 29 in bellows 27. The resultant cooling of bellows 27 opens damper 16 to admit cooled air to the interior 10. When the temperature of the interior 10 has been thus reduced to 72°, sufficient contraction of bellows 56 takes place to add enough of portion 49b of resistance 49 to the circuit of heater coil 60 and battery 30 to lessen the heating of member 43 and to increase the heating of member 41 to bring about an engagement of contacts 32 and 34 so as to activate bellows 27 to move damper 16 in closing direction; thus by a gradual readjustment due to the modulated action of contacts 32 and 34, as described above, the damper 16 assumes and maintains the position necessary to maintain a 72° temperature within the space while the outside temperature is 85°. Thus heat leakage into the space 10 is counterbalanced.

If the temperature outside the space should increase to 86°, for example, expansion of bellows 69 adds sufficient of resistance 62 to the circuit of heater coil 60 and battery 30 to reset the standard of operation, thus to further vary the temperature within interior 10 in the above-described manner.

It will be seen that I maintain a proportionate difference in the temperature between the interior 10 and that outside, although my system may operate to produce an increasing or decreasing temperature difference according to the temperature values under which it is operating. In the instant case it was assumed that it was desirable to maintain a 70° temperature until the outside temperature exceeded 80° when a proportionate difference was to be maintained between the interior and exterior. Of course, it is to be understood that these temperature values are merely assumed or illustrative for explanatory purposes and that my system is capable of being set to operate for any practical set of temperature values.

Turning to Figure 2 wherein I have shown another embodiment of certain features of my invention as included in the system shown in Figure 1, most portions of the apparatus may be substantially similar and for that reason such portions are not reproduced in Figure 2. Thus, there are the two bi-metallic members 41 and 43 operated or actuated by similar heater coils 47 and 60 as in Figure 1. Also, resistance 49 with its associated parts, such as contact arm 51 and its control, is connected to coils 41 and 43 in a manner similar to that described above. Instead of including resistance 62 as in Figure 1 in the circuit of coil 60 and battery 30, however, I prefer to use in this instance an inherently variable resistance 73 responsive to outside temperature. Accordingly, upon an increase or decrease of variable resistance 73, substantially the same respective operations of the system take place as are brought about when there is an increase or decrease in the resistance 62 shown in Figure 1. Resistance 73 is made of a material having a positive temperature coefficient of resistance; its resistance increases with increase in temperature. Hence, should it be subject to an increase in temperature, the resistance thereof increases proportionately. For instance, suppose this embodiment of my invention is installed upon a railway car operating under the temperature conditions above assumed in connection with Figure 1. When the outside temperature increases, the resistance of resistance 73 increases proportionately to this rise and vice versa. Accordingly, a modulation of the control is brought about to maintain any desired difference between the inside and outside temperatures. Under certain conditions, I may find this embodiment advantageous.

In another embodiment of certain features of my invention, shown in Figure 3, I have removed resistance 62 from the system which I have shown in Figure 1 and a conductor 74 connects the lower end of heater coil 60, as viewed in the drawings, directly to one side of resistance 49. Shunted across resistance 49 by way of conductors 75 and 76 is a resistance 77. A contact arm 78, pivoted as at 79, so that it may move to any position along resistance 77, is connected to the free end 81 of an expansible bellows generally indicated at 82 by a rod 78a. Thus, expansion and contraction of bellows 82 move arm 78 to various positions along resistance 77.

Bellows 82 may be anchored in any convenient manner as at 83 and a conduit 84 leads therefrom to a bulb 85 containing a readily volatile liquid having substantially the same properties as the volatile liquid contained in bulb 72 (Figure 1). Bulb 85 is exposed to the exterior of space 10. Arm 78 is connected to conductor 31 by a conductor 86. In this manner, a circuit is completed between heater coil 47 and battery 30, this circuit extending from one side of the battery 30, conductor 35, to the heater coil 47, conductor 50, resistance 49, arm 51, and thence by way of conductors 53 and 31 to the other side of the battery, while the circuit of heater coil 60 extends from one side of the battery 30, conductors 35 and 61, to the heater coil 60, conductors 74, resistance 49, arm 51 and then by way of conductors 53 and 31 back to the battery.

Resistance 77 also has a critical point B which may be substantially similar in position to critical point A on resistance 49 which has been described above. Portions 49a and 77a of resistances 49 and 77 respectively are in parallel with each other and in the circuit of heater coil 47 and battery 30. The parallelism of portions 49a and 77a is achieved by arm 78, conductor 86, conductor 31, conductor 53, and arm 51 on the one hand and, on the other hand by conductor 76 connecting the two ends of portions 77a and 49a. In a like manner, the parallelism of portions 77b and 49b may be traced. Therefore, the combined resistance 49a and 77a controls the amount of current passing through heater coil 47 while the combined resistance of portions 49b and 77b controls the current flowing through heater coil 60.

The character of the temperature-responsive system which includes bulb 85 is such that arm 78 is not moved along resistance 77 until the temperature to which the bulb 85 is exposed is in excess of a certain predetermined value which, in the above-described instance in connection with Figure 1, was assumed to be 80°. Assuming, then, that this embodiment of my invention is operating under the above-assumed temperature conditions, the operation thereof is substantially similar to that described with reference to the system shown in Figure 1 until the temperature outside of the space rises above 80°. It will be noted that when that temperature rises above 80°, to say 85°, it is desirable to maintain an inside temperature of 72°. However, when the inside temperature is 72°, bellows 56 (Figure 1) has moved arm 51 (Figure 3) so that portion 49b of resistance 49 substantially decreases the resistance in the circuit of heater coil 60 and battery 30. If resistance 77 was not in the circuit, the result would be a greater flow of current through heater coil 60 than through heater coil 47 (heater coil 47 having the larger portion of the resistance 49 in its circuit) which, referring to Figure 1, would force contact 34 out of engagement with contact 32 to produce cooling by opening damper 16.

However, if the outside temperature is 85°, bellows 81 (Figure 3) expands to move arm 78 a substantial distance along resistance 77 and thus make the total resistance of parallel portions 77b and 49b, which are in the circuit of coil 60, greater than the total resistance of parallel portions 49a and 77a, which are in the circuit of heater coil 47 and which, by the way, have their total resistance decreased by the same action of bellows 81. Therefore, bi-metallic member 43 is relatively cooler than bi-metallic member 41 to keep contacts 34 and 32 in engagement, as shown in Figure 1, even though arm 51 has moved along resistance 49 to decrease portion 49b and increase portion 49a thereof. Accordingly, under this set of conditions, the circuit between heater coil 29 and battery 30 (Figure 1) is maintained to keep damper 16 closed, thus shutting off the supply of cool air to space 10.

When the temperature in the interior of the car rises above 72°, arm 51 is moved a sufficient distance to the left, as viewed in Figure 3, to reduce portion 49b of resistance 49 so materially that even when this resistance is added with the large portion 77b of resistance 77 (due to the 85° outside temperature), the total resistance thereof is smaller than the resistance in the circuit of heater coil 47 (portions 49a and 77a). In this case, bi-metallic member 43 becomes warmer than bi-metallic member 47 (whose heating is actually reduced) to disconnect contacts 34 and 32 (Figure 1) and open the damper 16 to start cooling until the interior of the car reaches 72° again.

Accordingly, the interior of the car will be maintained at 72° as long as the outside temperature remains at 85° and, when the outside temperature rises above 85°, the inside temperature will be raised proportionately by the movement of arm 85 along resistance 77 (increasing resistance 77b) while a decrease thereof produces the opposite effect. In this manner, I have provided another means for producing and maintaining the difference of temperature, which has been described in detail above, in such a way as to be highly advantageous for certain conditions of use.

It will thus be seen that I have provided a thoroughly practical and efficient system and apparatus in which the above-mentioned objects as well as many others are successfully and practically achieved.

As many possible embodiments may be made of the mechanical features of the above invention and as the art herein described might be varied in various parts, all without departing from the scope of the invention, it is to be understood that all matter hereinabove set forth or shown in the accompanying drawings is to be interpreted as illustrative and not in a limiting sense.

I claim:

1. In a temperature regulating system, in combination, a space whose temperature is to be regulated, means for cooling said space, thermally responsive means adapted when heated to decrease the effect of said cooling means on said space, electric means for applying heat to said thermally responsive means, a source of current, a circuit between said source of current and said electric means, a resistance in said circuit, means for decreasing said resistance as the temperature inside said space rises, and means responsive to the outside atmospheric temperature for increasing said resistance upon a rise in said outside temperature whereby the temperature of said space is gradually increased as the outside temperature rises.

2. In a temperature regulating system, in combination, a space whose temperature is to be regulated, means for affecting the temperature of said space, means responsive to the application of heat for controlling the action of said temperature affecting means, heating means for said last-mentioned means, thermally responsive means for controlling the action of said heating means, electric means for heating said thermally responsive means, a resistance for controlling the action of said electric means, means for regulating said resistance in response to the temperature inside said space, and means for regulating said resistance in response to the outside atmospheric temperature when said outside temperature is above a certain limit.

3. In a temperature regulating system, in combination, a space whose temperature is to be regulated, means for affecting the temperature of said space, means responsive to the application of heat for controlling the action of said temperature affecting means, heating means for said last-mentioned means, a pair of thermally responsive members whose actions coordinate to control the action of said heating means when said members are at different temperatures, heating elements for each of said thermally responsive members, means for controlling the action of said elements in response to the temperature inside said space, and means for modifying the action of said last-mentioned means in response to the outside atmospheric temperature.

4. In a temperature regulating system, in combination, a space whose temperature is to be regulated, means for affecting the temperature of said space, means responsive to the application of heat for controlling the action of said temperature affecting means, heating means for said last-mentioned means, a pair of thermally responsive members whose actions coordinate to control the action of said heating means when said members are at different temperatures, a pair of electric parts for heating said thermally responsive members, a resistance for controlling the action of both of said electric parts, means for regulating said resistance in response to the temperature inside said space, and means for regulating said resistance in response to the outside atmospheric temperature when said outside temperature is above a certain limit.

5. In a temperature regulating system, in combination, a space whose temperature is to be regulated, means for affecting the temperature of said space, means responsive to the application of heat for controlling the action of said temperature affecting means, heating means for said last-mentioned means, thermally responsive means for controlling the action of said heating means, said heat responsive controlling means adapted to modify the action of said thermally responsive means, heating means for said thermally responsive means, means for regulating the action of said last-mentioned heating means in response to the temperature inside said space, and means responsive to the temperature outside said space for modifying the action of said last-mentioned means.

6. In a temperature regulating system, in combination, a space whose temperature is to be regulated, means for affecting the temperature of said space, means responsive to the application of heat for controlling the action of said temperature affecting means, heating means for said last-mentioned means, thermally responsive means for controlling the action of said heating means, electric means for heating said thermally responsive means, a variable resistance for regulating the action of said electric means, means for varying said resistance in response to the temperature inside said space, and means for varying said resistance in response to the outside atmospheric temperature.

7. In a temperature regulating system, in combination, a space whose temperature is to be regulated, means for affecting the temperature of said space, means responsive to the application of heat for controlling the action of said temperature affecting means, heating means for said last-mentioned means, a pair of thermally responsive members which when at different temperatures are adapted to coordinate to control the action of said heating means, a pair of heating elements for heating each of said thermally responsive members, means for controlling the action of said heating elements in response to the temperature inside said space, and means responsive to the outside atmospheric temperature for modifying the action of said last-mentioned means when said outside temperature is above a predetermined limit.

8. In a temperature regulating system, in combination, a space whose temperature is to be regulated, means for affecting the temperature of said space, means responsive to the application of heat for controlling the action of said temperature affecting means, heating means for said last-mentioned means, a pair of thermally responsive members which when at different temperatures are adapted to coordinate to control the action of said heating means, a pair of electric heating parts one for each of said thermally responsive members, a variable resistance for regulating the action of said electric parts, means responsive to the temperature inside said space for controlling said resistance, and means responsive to the outside atmospheric temperature for modifying the action of said last-mentioned means.

9. In a temperature regulating system, in combination, a space whose temperature is to be regulated, means for affecting the temperature of said space, means responsive to the application of heat for regulating said temperature affecting means, electric heating means for said regulating means, thermally responsive means adapted to complete a circuit to said electric heating means, means for heating said thermally responsive means in accordance with the temperature requirements of said space, and means responsive to the outside atmospheric temperature for modifying the action of said last-mentioned means.

10. In a temperature regulating system, in combination, a space whose temperature is to be regulated, means for affecting the temperature of said space, means responsive to the application of heat for regulating said temperature affecting means, electric heating means for said regulating means, thermally responsive means adapted to complete a circuit to said electric heating means, electric means for heating said thermally responsive means, a variable resistance for regulating the action of said electric means, means responsive to the temperature inside said space for varying said resistance, and means for varying said resistance in response to the outside atmospheric temperature when said outside temperature is above a certain limit.

11. In a temperature regulating system, in combination, a space whose temperature is to be regulated, means for affecting the temperature of said space, means responsive to the application of heat for regulating said temperature affecting means, electric heating means for said regulating means, a pair of thermally responsive members which when at different temperatures coordinate to complete a circuit to said electric heating means, heating elements for each of said thermally responsive members, means for controlling the action of said heating elements in response to the temperature inside said space, and means responsive to the outside atmospheric temperature for modifying the action of said last-mentioned means.

12. In a temperature regulating system, in combination, a space whose temperature is to be regulated, means for affecting the temperature of said space, means responsive to the application of heat for regulating said temperature affecting means, electric heating means for said regulating means, a pair of thermally responsive members which when at different temperatures coordinate to complete a circuit to said electric heating means, electric heating elements for each of said thermally responsive members, a variable resistance for regulating the action of said heating elements, means for varying said resistance in response to the temperature inside said space, and means for varying said resistance in response to the outside atmospheric temperature when said outside temperature is above a certain limit.

13. In a temperature regulating system, in combination, means forming a space whose temperature is to be regulated, means for affecting the temperature of said space, means for controlling the action of said temperature affecting means including a thermostatic bellows, a heating coil for said bellows, a source of current, a circuit between said source of current and said heating coil, a switch in said circuit, and means responsive to the temperature outside said space for controlling said switch, said bellows adapted to act on said switch to modify the action of said first-mentioned means.

14. In a temperature regulating system, in combination, means forming a space whose temperature is to be regulated, cooling apparatus for said space, electro-responsive means for regulating the effect of said cooling apparatus on said space, a source of current, a circuit between said source of current and said electro-responsive means, a variable resistance in said circuit responsive to the temperature of said space, and a variable resistance in said circuit responsive to the outside atmospheric temperature conditions, said last-mentioned resistance adapted to increase as said outside temperature rises whereby higher temperature levels may be maintained in said space as said outside temperature rises.

15. In a temperature regulating system, in combination, means forming a space whose temperature is to be regulated, cooling apparatus for said space, electro-responsive means adapted to increase the effect of said cooling apparatus on said space or decrease the effect thereof in accordance with the amount of current passed therethrough, and means for controlling the flow of current to said electro-responsive means in accordance with temperature conditions inside said space and outside said space whereby higher temperature levels may be maintained in said space as said outside temperature rises.

16. In a temperature regulating system, in combination, means forming a space whose temperature is to be regulated, cooling apparatus for said space, electro-responsive means adapted to increase the effect of said cooling apparatus on said space or decrease the effect thereof in accordance with the amount of current passed therethrough, means for varying the flow of current to said electro-responsive means in accordance with fluctuations in temperature in said space, and means for setting the standard of operation of said last-mentioned means in accordance with the atmospheric temperature conditions existing outdoors whereby higher temperature levels may be maintained in said space as said outside temperature rises.

17. In a temperature regulating system, in combination, means forming a space whose temperature is to be regulated, cooling means for said space, thermally responsive means adapted to decrease the effect of said cooling means on said space when actuated, means responsive to the temperature of said space for controlling the action of said thermally responsive means, and means responsive to the outside atmospheric temperature adapted to coact with said last-mentioned means to actuate said thermally responsive means on substantially each rise in said outside temperature.

18. In a temperature regulating system, in combination, means forming a space whose temperature is to be affected, cooling apparatus for said space, means for varying the effect of said apparatus on said space and adapted to decrease said effect when actuated, means including an electric circuit for controlling the operation of said last-mentioned means, a resistance in said circuit, means for varying said resistance in response to the temperature inside said space, and a second resistance in said circuit, said last-mentioned resistance adapted to vary in quantity according to temperature variations and being located outdoors whereby higher temperature levels may be maintained within said space as said outdoor temperature rises.

19. In a temperature regulating system, in combination, means forming a space whose temperature is to be affected, cooling apparatus for said space, means for varying the effect of said apparatus on said space, a pair of electrical parts for controlling the operation of said last-mentioned means, a pair of variable resistances in circuit with said electrical parts, means for varying one of said resistances in response to the temperature of said space, and means for varying the other of said resistances in response to outdoor temperature conditions whereby higher temperature levels may be maintained within said space as said outdoor temperature rises.

20. In apparatus for air conditioning a space, in combination, a control switch for the apparatus, means including a heater operably associated with said switch and adapted to control the opening and closing of said switch in accordance with the temperature of said heater, thermostatic means responsive to the temperature outside said space for regulating the operation of said heater, and means responsive to the temperature inside said space and operably associated with said heater for modifying the controlling action of said heater on said switch.

21. In apparatus for air conditioning a space, in combination, a control switch for the apparatus, electric means operably associated with said switch and adapted to control the opening and closing of said switch in accordance with the amount of current passing through said electric means, thermostatic means responsive to the temperature outside said space adapted to regulate the flow of current through the circuit of said electric means, and means responsive to the temperature inside said space and operably associated with said electric means for modifying the controlling action of said electric means on said switch.

22. In apparatus for air conditioning a space, in combination, a pair of heating coils in circuit operatively connected to control the conditioning apparatus, and thermostatic apparatus responsive to the temperature in the space and the temperature outside said space for controlling said circuit to change the operating characteristics of said coils to control said conditioning apparatus through said coils.

23. In apparatus for air conditioning a space, in combination, a controller for the apparatus, heat responsive means operably associated with said controller, a pair of heater coils associated with said heat responsive means and adapted to control said heat responsive means in accordance with the amount of current passing through said coils, means responsive to the temperature outside said space for regulating the flow of current through said coils, and means responsive to the temperature inside said space for modifying the action of said heat responsive means on said controller.

24. In apparatus for air conditioning a space, in combination, a controller for the apparatus, heat responsive means operably associated with said controller, a pair of heater coils associated with said heat responsive means and adapted to control said heat responsive means in accordance with the amount of current passing through said coils, resistance means adapted to be placed in the circuit of said coils, a controller for said resistance means, means responsive to the temperature outside said space adapted to regulate the operation of said controller, and means responsive to the temperature inside said space for modifying the action of said heating means on said first-mentioned controller.

25. In apparatus for air conditioning a space, in combination, a controller for the apparatus including a coil, means comprising a switch in the circuit of said coil and including a pair of heat sensitive elements, the opening and closing of said switch being dependent upon the respective temperatures of said heat sensitive elements, a pair of electric heaters each associated with one of said heat sensitive elements, means for regulating the amount of current passing through each of said coils in accordance with temperature conditions outside of said space, and means responsive to temperature conditions within said space and associated with said first-mentioned means to modify the operating characteristics of said heat sensitive elements.

26. In apparatus for air conditioning a space, in combination, a controller for the apparatus including a coil, means comprising a switch in the circuit of said coil and including a pair of heat sensitive elements, the opening and closing of said switch being dependent upon the respective temperatures of said heat sensitive elements, means operably connected to said first-mentioned means for controlling said switch in accordance with temperature conditions inside said space, and means for regulating the amount of current passing through each of said coils in accordance with temperature conditions outside of said space to set the standard of operation of said last-mentioned means.

27. The method of air conditioning a space in which the conditioning equipment is employed under the control of one circuit and in which a second circuit controls the first circuit in accordance with the amount of current passing through the second circuit, comprising varying the amount of current flowing in the second circuit in accordance with temperature conditions outside said space and modifying the controlling action of said second circuit in accordance with temperature conditions inside the space.

LOUIS H. VON OHLSEN.